United States Patent
Bosch et al.

(10) Patent No.: US 11,277,337 B2
(45) Date of Patent: Mar. 15, 2022

(54) SYSTEMS AND METHODS FOR ROUTING NETWORK TRAFFIC USING LABELS

(71) Applicant: Cisco Technology Inc., San Jose, CA (US)

(72) Inventors: Hendrikus G. P. Bosch, Aalsmeer (NL); Stefan Olofsson, Dubai (AE); Ijsbrand Wijnands, Leuven (BE); Anubhav Gupta, Freemont, CA (US); Jeffrey Napper, Delft (NL); Sape Jurriën Mullender, Amsterdam (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/750,139

(22) Filed: Jan. 23, 2020

(65) Prior Publication Data

US 2020/0389393 A1    Dec. 10, 2020

Related U.S. Application Data

(60) Provisional application No. 62/858,207, filed on Jun. 6, 2019, provisional application No. 62/858,245, filed on Jun. 6, 2019.

(51) Int. Cl.
| | |
|---|---|
| *H04L 12/723* | (2013.01) |
| *H04L 12/755* | (2013.01) |
| *H04L 12/717* | (2013.01) |
| *H04L 29/12* | (2006.01) |
| *H04L 29/06* | (2006.01) |
| *H04L 29/08* | (2006.01) |
| *H04L 12/741* | (2013.01) |
| *H04L 12/725* | (2013.01) |
| *H04L 45/50* | (2022.01) |
| *H04L 45/021* | (2022.01) |

(Continued)

(52) U.S. Cl.
CPC ............ *H04L 45/50* (2013.01); *H04L 45/021* (2013.01); *H04L 45/42* (2013.01); *H04L 61/1511* (2013.01); *H04L 63/20* (2013.01); *H04L 67/327* (2013.01)

(58) Field of Classification Search
None
See application file for complete search history.

(56) References Cited

U.S. PATENT DOCUMENTS

| | | | |
|---|---|---|---|
| 2007/0091875 A1* | 4/2007 | Rahman | H04L 67/14 370/352 |
| 2015/0096008 A1 | 4/2015 | Short et al. | |

(Continued)

OTHER PUBLICATIONS

Bosch, P. et al., "Private network for APPs and services with mobile SDWAN," Mar. 15, 2019, 4 pages.

(Continued)

*Primary Examiner* — Jay L Vogel
(74) *Attorney, Agent, or Firm* — Baker Botts, LLP

(57) ABSTRACT

In one embodiment, a method includes detecting a request to route traffic to a service associated with an application. The method also includes identifying an application identifier associated with the application and selecting, using the application identifier, a label from a plurality of labels included in a routing table. The label includes one or more routes. The method further includes routing the traffic to the service associated with the application using the label.

20 Claims, 5 Drawing Sheets

(51) Int. Cl.
*H04L 67/63* (2022.01)
*H04L 61/4511* (2022.01)
*H04L 45/42* (2022.01)

(56) References Cited

U.S. PATENT DOCUMENTS

| | | | |
|---|---|---|---|
| 2015/0103823 A1 | 4/2015 | Zheng | |
| 2016/0142963 A1* | 5/2016 | Salkintzis | H04L 45/308 |
| | | | 370/329 |
| 2016/0173440 A1* | 6/2016 | Stahura | G06F 16/9537 |
| | | | 709/245 |
| 2016/0269467 A1* | 9/2016 | Lee | H04W 12/03 |
| 2016/0323193 A1 | 11/2016 | Zhou et al. | |
| 2020/0259928 A1* | 8/2020 | Bonas | G06F 16/955 |

OTHER PUBLICATIONS

Patent Cooperation Treaty, Search Report and Written Opinion, International Application No. PCT/US2020/035045, dated Oct. 7, 2020, 13 pages.

* cited by examiner

SYSTEMS AND METHODS FOR ROUTING NETWORK TRAFFIC USING LABELS

CROSS-REFERENCE TO RELATED APPLICATIONS

This application claims benefit of U.S. Provisional Application No. 62/858,245 filed Jun. 6, 2019, by Hendrikus G. P. Bosch et al., and entitled "Private networking for ASPs and services with mobile SD-WAN," and U.S. Provisional Application No. 62/858,207 filed Jun. 6, 2019, by Hendrikus G. P. Bosch et al., and entitled "Application labels supporting better anomaly detection," which are incorporated herein by reference as if reproduced in its entirety.

TECHNICAL FIELD

This disclosure generally relates to routing traffic using labels, and more specifically to systems and methods for routing network traffic using labels.

BACKGROUND

Sensitive information may be transmitted through one or more nodes within a network. Certain nodes within the network may become compromised. For example, an attacker may gain access to one or more of the network nodes. If a network node is compromised, traditional protections may prove ineffectual in protecting the sensitive information traversing the compromised node.

DESCRIPTION OF EXAMPLE EMBODIMENTS

Overview

Figure 1:
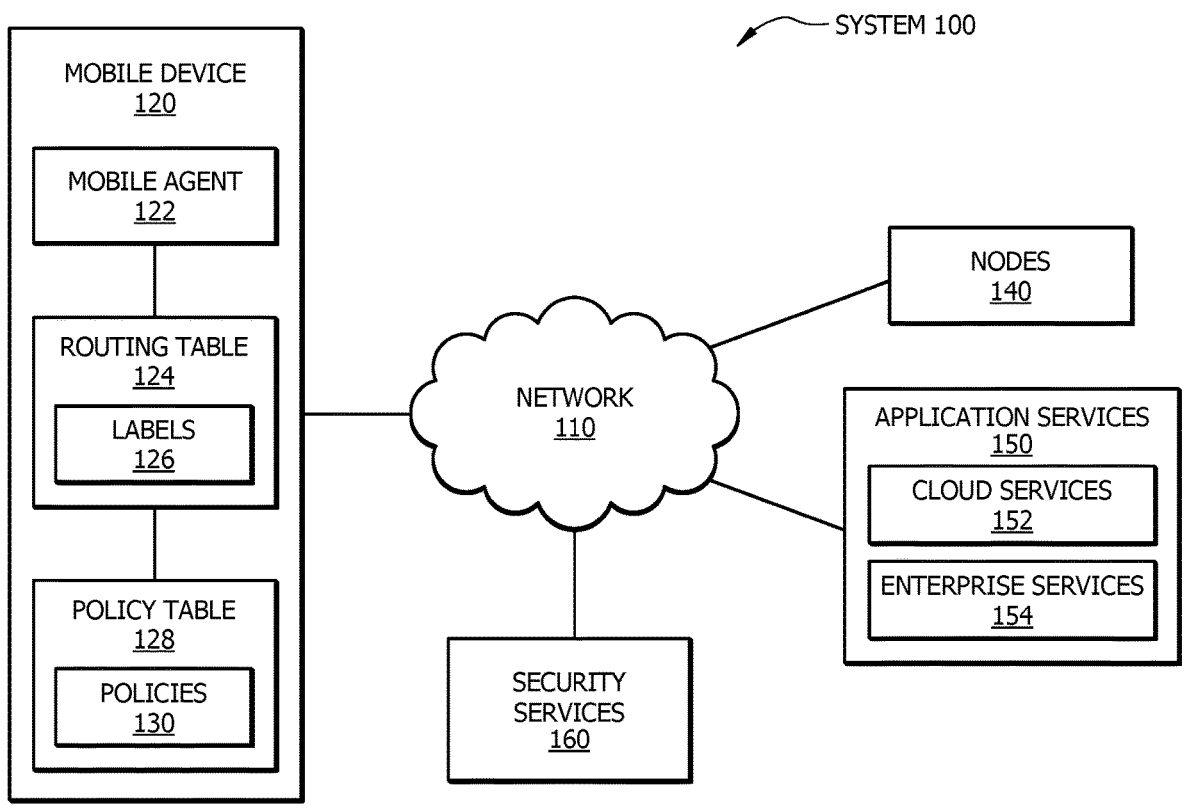
FIG. 1 illustrates an example system for routing network traffic using labels.

According to an embodiment, a device includes one or more processors and one or more computer-readable non-transitory storage media coupled to the one or more processors. The one or more computer-readable non-transitory storage media include instructions that, when executed by the one or more processors, cause the device to perform operations including detecting, by a mobile agent of the device, a request to route traffic to a service associated with an application. The operations further include identifying, by the mobile agent, an application identifier associated with the application and selecting, by the mobile agent and using the application identifier, a label from a plurality of labels included in a routing table. The selected label includes one or more routes. The operations further include routing, by the mobile agent, the traffic to the service associated with the application using the selected label. The label may be associated with one or more of the following: a Software-Defined Wide Area Network (SD-WAN); a virtual private network (VPN); a Multiprotocol Label Switching (MPLS) label; a Network Service Header (NSH) label; and a Generic Network Virtualization encapsulation (GENEVE) tunnel label. The service may be associated with one or more of the following: a public infrastructure as a service (IaaS); a private IaaS; a public software as a service (SaaS); a private SaaS; and a private enterprise service.

In certain embodiments, the label supports extranet services having inline security services, and the inline security services include one or more of the following: firewall services, intrusion detection services, intrusion prevention services, and Cloud Access Security Broker (CASB) services. In some embodiments, a head-end node receives the selected label, maintains one or more policies in a policy table, and uses the one or more policies and the selected label to route the traffic to the service associated with the application. In certain embodiments, the operations include receiving, by the mobile agent, a Domain Name System (DNS) request and using the application identifier to map the DNS request to the label. In certain embodiments, the operations may include maintaining, by the mobile agent, a policy table that includes one or more policies and mapping, by the mobile agent, the application identifier associated with the application to the label using the one or more policies.

According to another embodiment, a method includes detecting a request to route traffic to a service associated with an application. The method also includes identifying an application identifier associated with the application and selecting, using the application identifier, a label from a plurality of labels included in a routing table. The selected VPN label includes one or more routes. The method further includes routing the traffic to the service associated with the application using the selected label.

According to yet another embodiment, one or more computer-readable non-transitory storage media embody instructions that, when executed by a processor, cause the processor to perform operations including detecting a request to route traffic to a service associated with an application. The operations further include identifying an application identifier associated with the application and selecting, using the application identifier, a label from a plurality of labels included in a routing table. The selected label includes one or more routes. The operations further include routing the traffic to the service associated with the application using the selected label.

In traditional routing solutions, a network maintains a series of routing information base/forwarding information base (RIB/FIB) tables across the network's routers to help route flows between applications and services. Routing protocols find efficient and/or optimal paths between endpoints. The paths may include a sequence of network hops, and routing tables are generally built up at each hop to find the shortest paths to the destination network. One or more Internet service providers (ISPs) may be used to maintain the routes. A single RIB/FIB table maintains the most appropriate path to the service (e.g., the shortest path). Traditional routing solutions do not consider cases where multiple ISPs may be used to receive the same set of services and where each of these ISPs may offer a differentiated set of quality of service (QoS) classes and/or service level agreements (SLAs) to address services. Application service providers (ASPs) do not collaborate with ISPs to offer packages of services. This disclosure describes systems and methods for bundling applications by ASPs on labeled networks.

Technical advantages of certain embodiments of this disclosure may include one or more of the following. Certain embodiments of this disclosure introduce a mobile agent that manages label-driven routing tables and data forwarding on a mobile device. The mobile agent creates its own set of routing tables based on services that are contracted by an enterprise. An enterprise may select, on an application by application basis, a particular path (identified by its label) to provide access to a particular service, which may allow differentiated services and connectivity and the differentiated QoS classes per such pair. Allowing the establishment of private application/service networks provides an effective method for enterprises to address vulnerabilities in applications and services.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure generally relates to a label-based VPN. Certain embodiments of this disclosure introduce a mobile agent on a mobile device that incorporates a series of VPNs into an application/VPN routing table. Services, such as cloud or enterprise services, are supported on a set of labels offered by one or more ISPs. In certain embodiments, a head-end node translates the labels onto an SD-WAN label and/or onto other segmented networks when available. Once the mobile agent on the mobile device is configured for label-based connectivity to the services, gaining access to such services may involve an ASP. For example, the ASP may package up the service with an SD-WAN on the VPN label. The ASP may extend the SD-WAN VPN label to an enterprise user. The ASP may install, on the mobile device, an application/VPN routing table with SD-WAN VPN labels to facilitate the mobile device's connection to the contracted service. Given that there is no requirement that only a single ASP/ISP pair provides services, enterprises may receive the best possible ASP/ISP pair on an application-by-application basis for their users.

Figure 2:
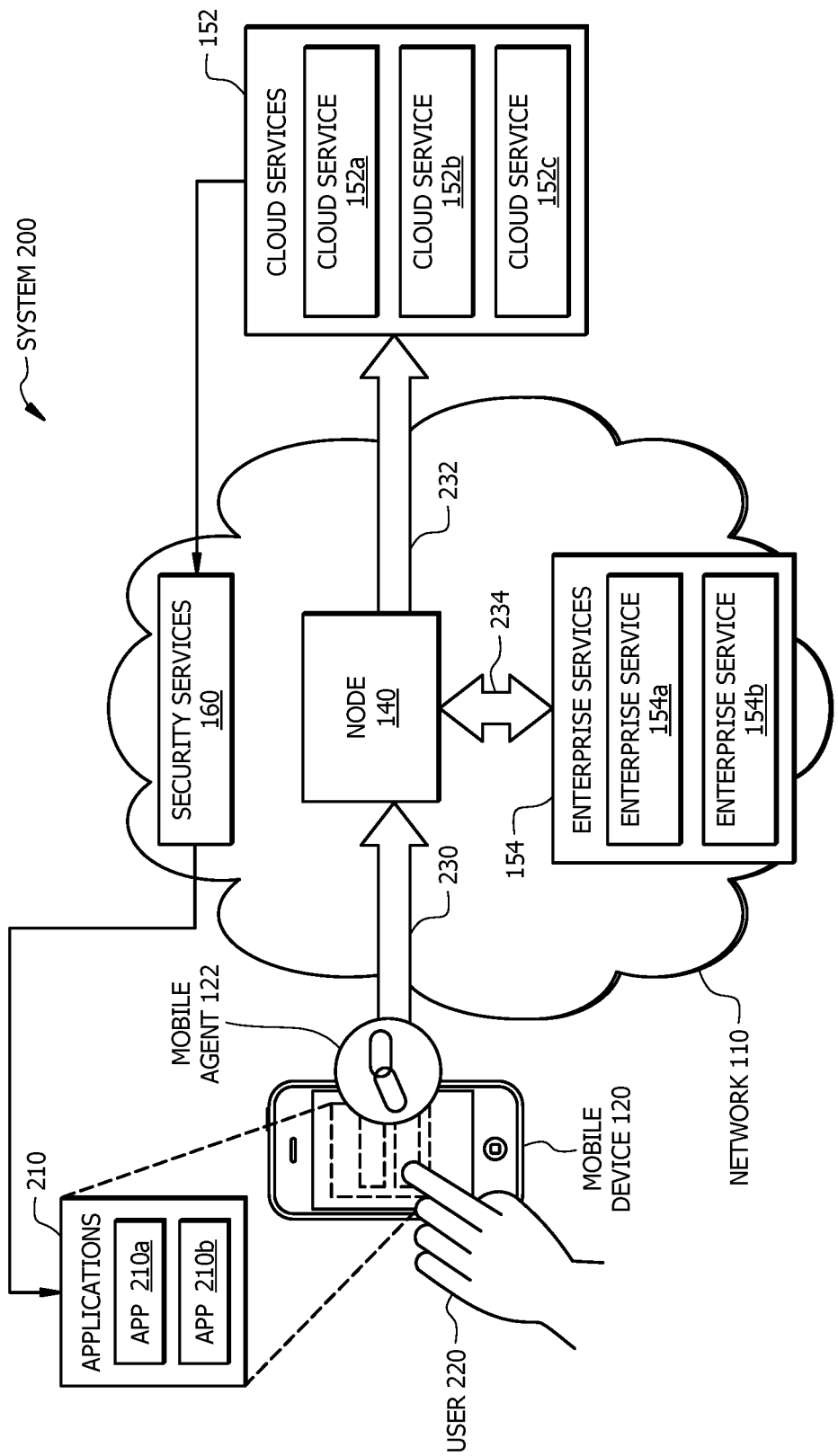
FIG. 2 illustrates an example system that may be used by the system of FIG. 1.
Figure 3:
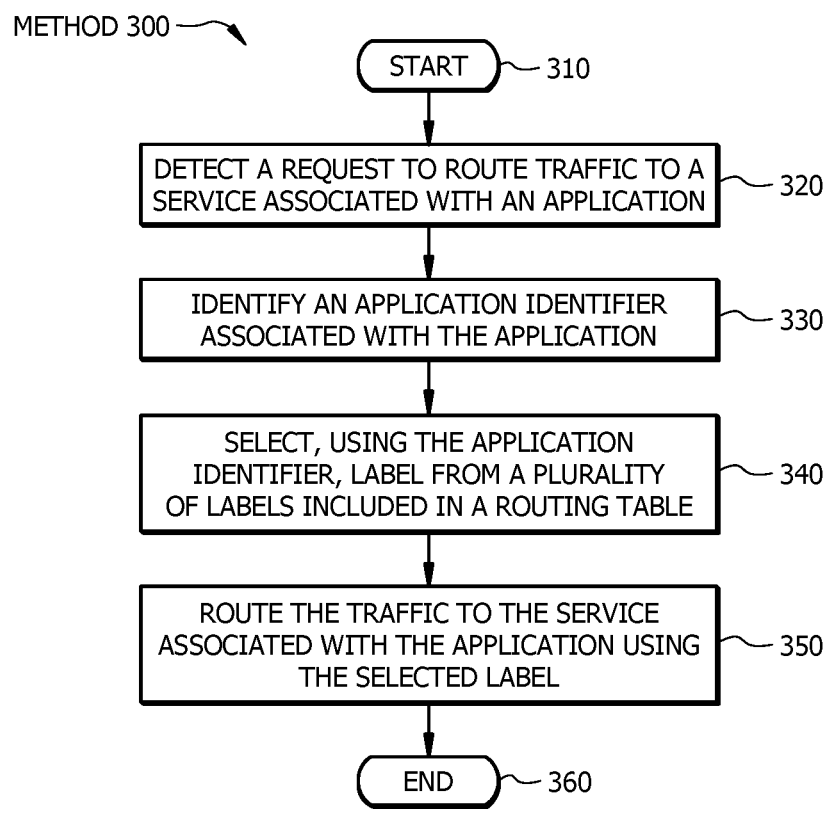
FIG. 3 illustrates an example method for routing network traffic using labels.
Figure 4:
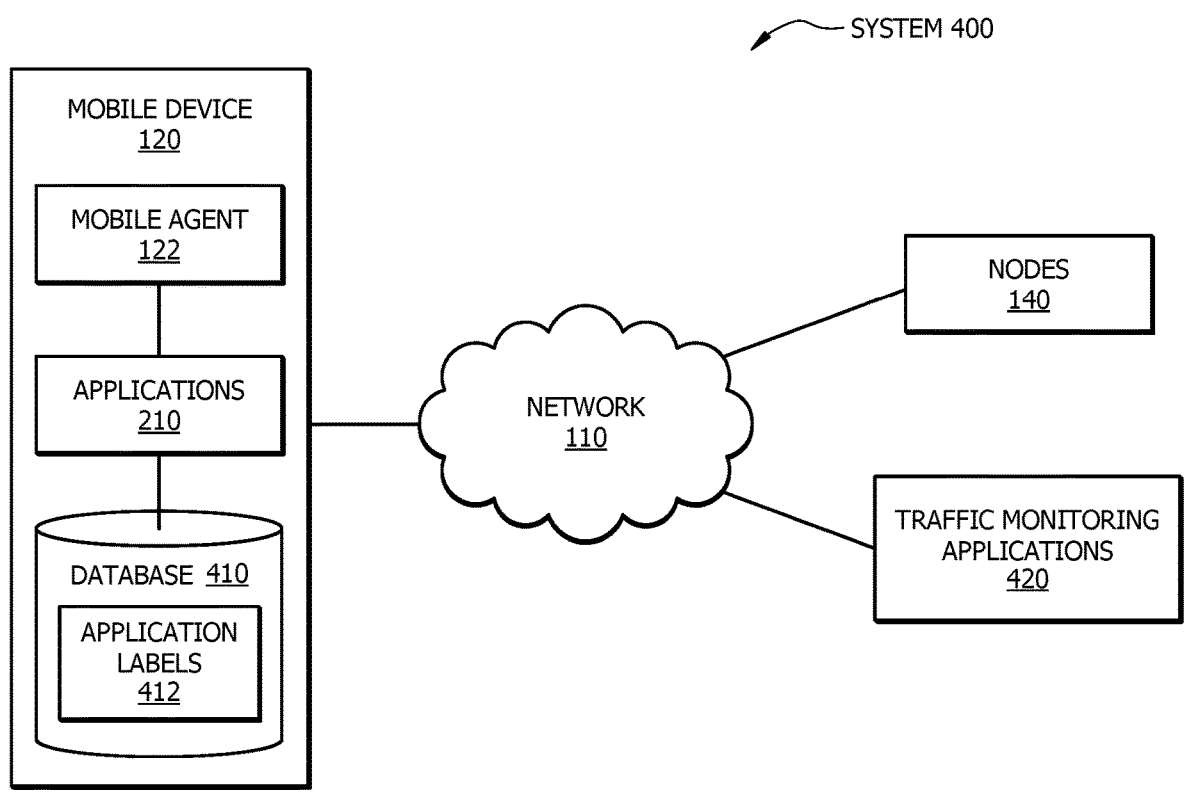
FIG. 4 illustrates an example system for routing network traffic using application labels.
Figure 5:
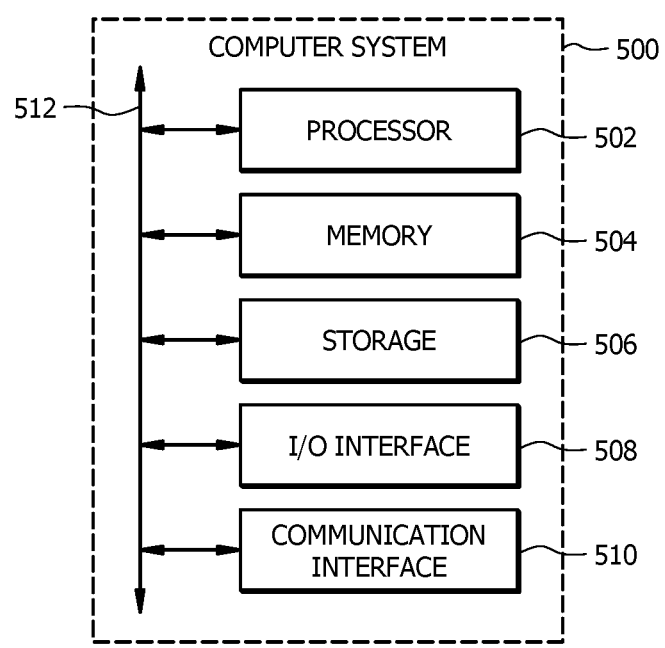
FIG. 5 illustrates an example computer system that may be used by the systems and methods described herein.

Certain embodiments of this disclosure include a mobile agent on a mobile device that creates a label associated with an application. At the head-end node, this label can be mapped to a network label to select routing tables (e.g., through Virtual Routing Forwarding Instances (VRFs)). That network label may be an SD-WAN label, a Multiprotocol-Border Gateway Protocol (MP-BGP) label, an MPLS label, etc. Labels may be stitched together by one or more service providers and ultimately lead to the application service (e.g., an enterprise network, a public or private IaaS, a public or private SaaS, etc. By bundling cloud applications on a cloud network and stitching the bundled applications to a local VRF (and thus a label), an end-to-end network between mobile devices, networks, and clouds is created. This network is considered to be a completely segregated network. FIG. 1 shows an example system for routing network traffic using labels and FIG. 2 shows an example system that may be used by the system of FIG. 1. FIG. 3 shows an example method for routing network traffic using labels. FIG. 4 shows an example system for routing network traffic using application labels. FIG. 5 shows an example computer system that may be used by the systems and methods described herein.

FIG. 1 illustrates an example system 100 for routing network traffic using labels 126. System 100 or portions thereof may be associated with an entity, which may include any entity, such as a business or company (e.g., a service provider) that routes network traffic using VPN labels. The components of system 100 may include any suitable combination of hardware, firmware, and software. For example, the components of system 100 may use one or more elements of the computer system of FIG. 5.

System 100 includes a network 110, a mobile device 120, a mobile agent 122, a routing table 124, VPN labels 126, a policy table 128, policies 130, nodes 140, application services 150, and security services 160. Network 110 of system 100 is any type of network that facilitates communication between components of system 100. Network 110 may connect one or more components of system 100. This disclosure contemplates any suitable network. One or more portions of network 110 may include an ad-hoc network, an intranet, an extranet, a VPN, a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an ISP network, and the like. One or more portions of network 110 may utilize SD-WAN technology.

Mobile device 120 of system 100 is any end device that can receive, create, process, store, and/or communicate information. For example, mobile device 120 may receive information (e.g., data packets) from one or more components (e.g., nodes 140) of system 100. As another example, mobile device 120 may communicate information (e.g., data packets) to one or more components (e.g., nodes 140) of system 100. In certain embodiments, mobile device 120 is a handheld computer. Mobile device 120 may be a mobile phone (e.g., a smart phone), a laptop computer, a tablet, a personal digital assistant, and the like. Mobile device 120 may include a liquid crystal display (LCD), an organic light-emitting diode (OLED) flat screen interface, digital buttons, a digital keyboard, physical buttons, a physical keyboard, one or more touch screen components, and the like. Mobile device 120 may be associated with an entity such as a service provider. Mobile device 120 may include a graphical user interface (GUI). Mobile device may include one or more components of the computer system of FIG. 5.

In certain embodiments, mobile device 120 utilizes one or more applications. The applications of mobile device 120 may include native applications that are built for a specific operating system, mobile web applications that render and/or deliver pages on browsers running in mobile device 120, and the like. The browsers of mobile device 120 are software applications for accessing information on the World Wide Web. One or more browsers may be optimized to display Web content effectively for small screens.

Mobile device 120 of system 100 includes mobile agent 122, routing table 124, and policy table 128. Mobile agent 122 runs as an application on mobile device 120 and performs specific tasks for mobile device 120. In certain embodiments, mobile agent 122 is a network agent (e.g., an SD-WAN agent) that is deployed on mobile device 120 to access a network (e.g., an SD-WAN network). Mobile agent 122 may maintain and/or manage routing table 124 and/or policy table 128 of mobile device 120. Mobile agent 122 may receive one or more labels 126 (e.g., VPN labels) of routing table 124 and/or one or more policies 130 of policy table 128 from one or more nodes 140 (e.g., a router or a network controller) of system 100.

In certain embodiments, mobile agent 122 detects a request to route traffic to application service 150 associated with an application of mobile device 120. For example, mobile agent 122 may capture traffic from mobile device 120 and determine how to route the traffic across network 110 (e.g., a mobile SD-WAN network) to one or more application services 150. In some embodiments, mobile agent 122 selects label 126 from routing table 124 and routes the traffic to application service 150 using selected label 126. For example, mobile agent 122 may identify an application identifier associated with the application and map the application identifier onto label 126 using one or more policies 130 from policy table 128. The application identifier is any identifier that uniquely identifies a particular application. In certain embodiments, the application identifier may be a unique application ID represented as a string of characters (e.g., numbers, letters, underscores, etc.). The application identifier may be represented by an application signature. Mobile agent 122 may assign a unique application ID to each application installed on mobile device 120. In some embodiments, the application identifier may be characteristics (e.g., traffic characteristics) associated with a particular application.

In some embodiments, mobile agent 122 routes traffic to application services 150 via segments (e.g., SD-WAN-hosted VPNs) of network 110. Each segment may uniquely provide network connectivity to a particular service 150. When an application on mobile device 120 selects service 150, mobile agent 122 may select an associated segment using routing table 126. Mobile agent 122 may manage routing tables 124 and data forwarding on mobile device 120. Mobile agent 122 may create its own set of routing tables 124 based on application services 150. In certain embodiments, mobile agent 122 may create a separate routing table 124 for each application of mobile device 120. When an application on mobile device 120 requests to use a particular service 150, once flows enter mobile agent 122, mobile agent 122 may select a segment in routing table 124 and, within that segment, route the traffic to that particular service 150. In certain embodiments, mobile agent 122 may identify an application identifier associated with an application and use the application identifier to select label 126 of routing table 124.

In some embodiments, mobile agent 122 may determine that incoming traffic originated from a browser application. Browser applications are special in that these applications may connect to multiple application services 150 simultaneously, which increases the threat attack surface for these applications. To mitigate the risk of attacks, in response to determining that the traffic originated from a browser application, mobile agent 122 may select label 126 that supports security services 160 (e.g., firewall services, intrusion detection services, intrusion prevention services, CASB services, and the like).

In certain embodiments, mobile agent 122 may determine that an application (e.g., a web-service application) requires access to a single sign-on (SSO) service by resolving the DNS name of the SSO service. In response to determining that an application requires access to an SSO service, mobile agent 122 may select a route from label 126 that routes the traffic to the SSO service. In some embodiments, mobile agent 122 may receive a DNS request. In response to receiving the DNS request, mobile agent 122 may map the DNS request to label 126 using an application identifier and as stipulated in routing table 124.

Routing table 124 of system 100 is a segregated application table that maps application flows onto labels 126 by way of policies 130. In the illustrated embodiment of FIG. 1, routing table 124 is stored on mobile device 120. Routing table 124 lists a series of labels 126. Routing table 124 may provide all routes that are required to operate a particular application and/or service 150. Routing table 124 may associate label 126 to that service 150. All routes to a particular service 150 may only be valid inside the scope of label 126.

Routing table 124 may be a segregated routing table for a single application. In certain embodiments, routing table 124 may include a single default route. In some embodiments, routing table 124 includes multiple routes to a particular service 150. For example, if application service 150 is associated with a domain name is available in California and in Europe, an enterprise user may have routes that point to the California service for the domain name over a local WI-FI connection and a separate route that points to a European service when traffic is routed over a cellular connection. As such, multiple routing entries may exist per each label 126 of routing table 124.

Routing table 124 may include one or more labels 126. Labels 126 of system 100 are labels used to direct traffic to one or more nodes 140 of network 110. Labels 126 may be associated with SD-WAN, VPN, MPLS, NSH, GENEVE, and the like. For example, label 126 may map to an MPLS label, an NSH label, a GENEVE tunnel label, etc. Each label 126 includes one or more routes necessary for a particular service 150. Labels 126 may refer to paths that lead to application services 150 hosted by one or more ASPs. Labels 126 may be associated with varying QoS managed networks. The QoS managed networks may be used to manage delay, delay variation (jitter), bandwidth, packet loss, and the like within network 110. Labels 126 may map to a particular network with a specific SLA. An SLA is a contract between a service provider and its internal or external customer that documents what services the provider will furnish. In certain embodiments, the SLA defines the service standards that the provider is obligated to meet. By including varying QoS and/or SLAs in with networks 110 that are associated with certain labels 126, labels 126 may create differentiated access to applications and application services 150 for enterprise users. Labels 126 may support extranet services with inline security services 160. An ASP may map labels 126 to an enterprise user by providing back-to-back labels similar to those used in MPLS and label remapping services. An enterprise may install routing table 124 in mobile agent 122 with labels 126 to connect to application services 150.

Policy table 128 is a collection of policies 130 that is used by mobile agent 122 to associate applications with specific labels 126. Policy table 128 may be stored on mobile device 120. Mobile device 120 (e.g., mobile agent 122) may receive policy table 128 and/or policies 130 from one or more nodes 140 of network 110. Policies 130 of policy table 128 may list, on a per application basis, which VPN supports routes to a particular service 150. Policies 130 may list which VPN supports routes to a particular service 150 by way of one or more application identifiers. The application identifiers may include unique identifiers associated with particular applications of mobile device 120, traffic characteristics associated with particular applications, operating systems associated with particular applications, and the like. Mobile agent 122 of mobile device 120 may use policies 130 of policy table 128 to map traffic onto specific labels 126. For example, mobile agent 122 may determine that incoming traffic was generated by a particular application, identify an application ID associated with the particular application, and map the application ID onto a specific network 110 and/or label 126 as instructed by one or more policies 130.

Nodes 140 of system 100 are connection points within network 110 that receive, create, store and/or send traffic along a path. Nodes 140 may include one or more endpoints and/or one or more redistribution points that recognize, process, and forward traffic to other nodes 140. Nodes 140 may include virtual and/or physical network nodes. In certain embodiments, one or more nodes 140 include data communications equipment such as switches, bridges, modems, hubs, and the like. In some embodiments, one or more nodes 140 include data terminal equipment such as routers, servers, printers, workstations, and the like. One or more nodes 140 may be host computers, ingress nodes, destination nodes, network controller nodes, path computation client (PCC) nodes, and the like. One or more nodes 140 within network 110 may receive traffic from other components of network 110. For example, one or more nodes 140 may receive traffic from mobile device 120. The incoming traffic may include data communications and network traffic originating from networks external to network 110. The incoming traffic may be destined for a target host/IP address within or external to network 110.

One or more nodes 140 may receive a request to route the incoming traffic through a path (e.g., a VPN tunnel). In certain embodiments, nodes 140 include a head-end node that receives label 126. A head-end node is a node that terminates tunnels (e.g., VPN tunnels) from mobile agent 122 and connects to a routed network. In some embodiments, the head-end node translates labels 126 onto other labels (e.g., an SD-WAN label) and/or onto other segmented networks when available. The head-end node may maintain one or more policies in a policy table and use the one or more policies and label 126 to route the traffic to application services 150. In certain embodiments, the head-end node may select a different label than the label selected by mobile device 120. For example, the head-end node may select a different label if the head-end node does not trust the decision of mobile device 120.

Application services 150 of system 100 are services that may be used by mobile device 120 to access one or more applications. Application services 150 may be contracted by an enterprise associated with mobile device 120. Application services 150 may be provided by one or more ASPs. Application services 150 include cloud services 152 and enterprise services 154. Cloud services 152 are public or private services that are available to a user of mobile device 120 from a cloud computing provider and provide services for the user. Cloud services 152 may be available to the user on demand via the Internet. Cloud services 152 may include offerings such as SaaS, platform as a service (PaaS), applications hosted on an IaaS, access to virtual machines and/or containers on such IaaS, and the like. Enterprise services 154 are private services that are made available to a user of mobile device 120 from an enterprise. Enterprise services 154 may be available to a user on demand. Enterprise services 152 may include offerings such as business-oriented tools (e.g., online shopping, online payment processing, etc.), automated billing systems, project management, collaboration, human resource management, manufacturing, occupational health and safety, and the like. Enterprise services may include private enterprise IaaS applications, SaaS offerings, PaaS offerings, and the like.

Security services 160 of system 100 are inline services that provide security to system 100. Security services 160 may provide security for browsers and/or other applications that are operating on mobile device 120. Security services 160 may be associated with authentication, access control, data confidentiality, data integrity, non-repudiation, etc. Security services 160 may include firewall services, intrusion detection services, intrusion prevention services, CASB services, and the like.

In operation, mobile agent 122 of mobile device 120 detects a request to route traffic to application service 150. For example, mobile agent 122 may detect that a user has directed a browser on device 120 at application service 150. Mobile agent 122 identifies an application identifier for the application associated with application service 150 and selects, using the application identifier, label 126 included in routing table 124 of mobile device 120. Mobile agent 122 then routes the traffic to application service 150 associated with the application using selected label 126. As such, system 100 routes traffic in accordance with labels 126 that map applications to specific services, which allows an enterprise to select, on an application by application basis, which network path provides access to a particular application service 150.

Although FIG. 1 illustrates a particular arrangement of network 110, mobile device 120, mobile agent 122, routing table 124, labels 126, policy table 128, policies 130, nodes 140, application services 150, and security services 160, this disclosure contemplates any suitable arrangement of network 110, mobile device 120, mobile agent 122, routing table 124, labels 126, policy table 128, policies 130, nodes 140, application services 150, and security services 160. For example, network 110 may include one or more network controllers. As another example, routing table 124 and policy table 128 may be a single table. Although FIG. 1 illustrates a particular number of networks 110, mobile devices 120, mobile agents 122, routing tables 124, labels 126, policy tables 128, policies 130, nodes 140, application services 150, and security services 160, this disclosure contemplates any suitable number of networks 110, mobile devices 120, mobile agents 122, routing tables 124, labels 126, policy tables 128, policies 130, nodes 140, application services 150, and security services 160. For example, mobile device 120 may include multiple mobile agents 122, multiple routing tables 124, and multiple policy tables 128.

FIG. 2 illustrates an example system 200 that may be used by the system of FIG. 1. System 200 or portions thereof may be associated with an entity, which may include any entity, such as a business or company (e.g., a service provider) that routes network traffic using labels. The components of system 200 may include any suitable combination of hardware, firmware, and software. For example, the components of system 200 may use one or more elements of the computer system of FIG. 5.

System 200 includes network 110, mobile device 120, user 220, applications 210 (application 210a and application 210b), mobile agent 122, node 140, cloud services 152 (cloud service 152a, cloud service 152b, and cloud service 152c), enterprise services 154 (enterprise service 154a and enterprise service 154b), and security services 160. Traffic may be communicated through system 200 via one or more labeled tunnels (e.g., tunnel 230, tunnel 232, and tunnel 234).

User 220 is any person, organization, or software program that uses mobile device 120. User 220 may utilize mobile device 120 to access one or more applications 210 using one or more services (e.g., cloud services 152 or enterprise services 154). Authentication of user 220 may be required prior to user 220 accessing the services. Each application 210 is a program or a set of programs that allows user 220 to perform particular functions. Applications 210 may include native applications that are built for a specific operating system, mobile web applications that render and/ or deliver pages on browsers running in mobile device 120, and the like.

Mobile agent 122 runs as an application (e.g., application 210a or 210b) on mobile device 120. Mobile agent 122 captures traffic from mobile device 120 and determines how to route traffic across network 110 to cloud services 152 and/or enterprise services 154. Mobile agent 122 uses a routing table (e.g., routing table 124 of FIG. 1) that lists a series of labels (e.g., labels 126 of FIG. 1) and/or other network attachments to determine how to route traffic across network 110. Each label carries a set of routes necessary for a particular service (e.g., cloud service 152 or enterprise service 154). Mobile agent 122 agent maintains a policy/ routing table (e.g., policy table 128 of FIG. 1) that directs mobile agent 122 how to map application identifiers associated with application 210 onto specific labels and/or networks.

The policy table within mobile agent 122 lists, on a per application basis and potentially by way of an application identifier, which network segment (e.g., VPN) supports routes to a particular cloud service 152 or enterprise service 154. For example, application 210b routes to an IP address associated with cloud service 152b. Mobile agent 122 receives an initial packet of a Transport Layer Security (TLS) flow (e.g., a transmission Control Protocol (TCP) synchronization (SYN) packet, a Datagram Transport Layer Security (DTLS) packet, etc.), identifies an application identifier from the information associated with the packet, and looks up the application identifier for application 210b in the policy/routing table. Mobile agent 122 discovers that the application identifier for application 201b is associated with a particular label (e.g., an SD-WAN or MPLS label) and/or network and searches in that particular label's RIB/FIB for the appropriate next hop for cloud service 152b. Mobile agent 122 then routes the traffic from mobile device 120 to node 140 along VPN tunnel 230. Node 140 may route the traffic to cloud service 152b along tunnel 232 in accordance with the particular label. As such, system 200 routes traffic in accordance with labels that map applications to specific services, which allows an enterprise to select, on an application by application basis, which network path provides access to a particular service.

In some embodiments, node 140 may use a different label and/or network than that received from mobile device 120 to route traffic to one or more services. For example, rather than routing the traffic to cloud service 152b along tunnel 232 in accordance with the label received from mobile agent 122, node 140 may select a different label and route the traffic to cloud service 152b along a tunnel other than tunnel 230 in accordance with the selected different label.

In certain embodiments, one or more applications 210 may be web browser applications 210. Web browser applications 210 may need to connect to multiple cloud services 152 and/or enterprise services 154 simultaneously. To mitigate the risk of attacks for web browser applications 210, when detecting traffic originating from a browser, mobile agent 122 may route all browser traffic across a label that supports extranet services with in-line security services 160. Security services 160 may include traditional firewalling, intrusion detection/prevention, a CASB, and/or other traffic segregation mechanisms. Security services 160 may reduce the threat attack surface for browsers and/or other applications 210 with unclear flow disposition.

In some embodiments, one or more applications 210 may require access to an on-premise authentication and authorization service (e.g., an SSO enterprise service) to obtain a service. The authentication and authorization service combines user identity with access right for enterprise users to back-end services (e.g., cloud services 152 and enterprise services 154). When SSO is used for authentication and authorization procedures, many client applications require routes to such SSO services, and a route on mobile device 120 may be installed that routes to the enterprise SSO service. The SSO service may be shared among a number of different applications 210 including browser applications 210.

In certain embodiments, when application 210 selects cloud service 152 or enterprise service 154, application 210 may use a Fully Qualified Domain Name (FQDN) to resolve an IP address. An FQDN is a domain name that specifies its exact location in the tree hierarchy of a DNS. Given that the IP addresses may be private per server application, DNS requests may be segregated and routed independently. When DNS caching is enabled, each VPN may support its own cache. DNS requests may be routed inside each labeled network separately. Application identifiers are used to map the DNS request on the appropriate label.

Although FIG. 2 illustrates a particular arrangement of network 110, mobile device 120, user 220, applications 210, mobile agent 122, node 140, cloud services 152, enterprise services 154, and security services 160, this disclosure contemplates any suitable arrangement of network 110, mobile device 120, user 220, applications 210, mobile agent 122, nodes 140, cloud services 152, enterprise services 154, and security services 160. For example, system 200 of FIG. 2 may include multiple nodes 140 between mobile device 120 and cloud services 152. Although FIG. 2 illustrates a particular number of networks 110, mobile devices 120, users 220, applications 210, mobile agents 122, nodes 140, cloud services 152, enterprise services 154, and security services 160, this disclosure contemplates any suitable number of networks 110, mobile devices 120, users 220, applications 210, mobile agents 122, nodes 140, cloud services 152, enterprise services 154, and security services 160. For example, mobile device 120 may include multiple mobile agents 122.

FIG. 3 illustrates an example method 300 for routing network traffic using labels. Method 300 begins at step 310. At step 320, a mobile agent (e.g., mobile agent 122 of FIG. 1) of a mobile device (e.g., mobile device 120 of FIG. 1) detects a request to route traffic to a service (e.g., service 150 of FIG. 1) associated with an application (e.g., application 210 of FIG. 2). For example, the mobile agent of the mobile device may determine that a user (e.g., user 220 of FIG. 2) selected a service on the mobile device by directing a browser on the mobile device at the service. Method 300 then moves from step 320 to step 330.

At step 330, the mobile agent identifies an application identifier associated with the application. For example, the mobile agent may receive a packet of a TLS flow and identify an application identifier from the information associated with the packet. Method 300 then moves from step 330 to step 340. At step 340, the mobile agent selects, using the application identifier, a label (e.g., an SD-WAN or MPLS label) from a plurality of labels included in a routing table. For example, the mobile agent may select, using the application identifier and the network configuration, a label that supports extranet services having inline services (e.g., firewall services, intrusion detection services, intrusion prevention services, CASB services, etc.) from a plurality of labels included in a routing table. Method 300 then moves from step 340 to step 350. At step 350, the mobile agent routes the traffic to the service associated with the application using the selected label or configured network. Method 300 then moves from step 350 to step 360, where method 300 ends.

Although this disclosure describes and illustrates particular steps of method 300 of FIG. 3 as occurring in a particular order, this disclosure contemplates any suitable steps of method 300 of FIG. 3 occurring in any suitable order. Although this disclosure describes and illustrates an example method 300 for routing network traffic using labels including the particular steps of the method of FIG. 3, this disclosure contemplates any suitable method 300 for routing network traffic using labels, including any suitable steps, which may include all, some, or none of the steps of the method of FIG. 3, where appropriate. For example, method 300 may include additional steps directed to receiving a DNS request and mapping the DNS request to a label. Although this disclosure describes and illustrates particular components, devices, or systems carrying out particular steps of method 300 of FIG. 3, this disclosure contemplates any suitable combination of any suitable components, devices, or systems carrying out any suitable steps of method 300 of FIG. 3.

FIG. 4 illustrates an example system 400 for routing network traffic using application labels 412. System 400 or portions thereof may be associated with an entity, which may include any entity, such as a business or company (e.g., a service provider) that routes network traffic using application labels 412. The components of system 400 may include any suitable combination of hardware, firmware, and software. For example, the components of system 400 may use one or more elements of the computer system of FIG. 5.

System 400 includes network 110, mobile device 120, mobile agent 122, applications 210, database 410, application labels 412, nodes 140, and traffic monitoring applications 420. Network 110, mobile device 120, mobile agent 122, applications 210, and nodes 140 are described above in FIGS. 1 through 3. Database 410 stores certain types of information for system 400. For example, database 410 may store application labels 412. Database 410 may be any one or a combination of volatile or non-volatile local or remote devices suitable for storing information. Database 410 may include random access memory (RAM), read-only memory (ROM), magnetic storage devices, optical storage devices, or any other suitable information storage device or a combination of these devices. Database 410 may be located at any location suitable for database 410 to communicate with mobile agent 122.

Application labels 412 of system 400 are labels carried by traffic within network 110 that are used to identify applications 210 associated with the traffic. Each application label 412 may include the type and/or the version of application 210. For example, application label 412 may include an integer that represents the type and/or version of application 210. As another example, application label 412 may be a flow label that incorporates the application type and/or version in the flow label. Network 110 uses application labels 412 to determine which application 210 is responsible for a particular data stream.

In certain embodiments, application label 412 may be a modified MPLS label. For example, the MPLS label may have 20 bits that can be freely assigned, and some of these bits may be used to encode application 210 (e.g., an indication of a version of application 210) to generate application label 412. As another example, the MPLS label may include a default value for "all other applications," which may be used to encode application 210 into MPLS label to generate application label 412. If a small number of bits (i.e., less than 20 bits) is used to encode application 210, a database (e.g., database 410 of FIG. 4) may be used to map application names to the numbers used for the encoding. Mobile agent 122 of mobile device 120 may access database 410 when mobile agent 122 connects to network 110. In some embodiments, application label 412 only carries the application identifier.

In certain embodiments, application label 412 may indicate that associated application 210 is a browser application 210. Traffic labeled, via application label 412, as browser traffic may be subjected to more specialized or more rigorous checks than traffic from other applications 210, which may reduce the load on anomaly detection system 400. A label may be used to subject browser traffic to more specialized checks. This label may be assigned by one or more nodes 140 in a fashion transparent to mobile device 120.

Traffic monitoring applications 420 of system 400 are applications used to monitor traffic of network 110. Traffic monitoring applications 420 may include firewall applications, anomaly detection applications, vulnerability detection applications, threat detection applications, threat prevention applications, and the like. Traffic-monitoring applications 420 may run on one or more nodes 140 and/or on mobile device 120 of network 110. Traffic monitoring applications 420 may use application labels 412 to detect anomalies in one or more applications 210. Each application label 412 may provide information to traffic monitoring application 412 about which application 210 is responsible for the associated network connection. Traffic for a particular application 210 has a narrower range of flow types as compared to all incoming traffic. As such, traffic monitoring applications 420 may use application labels 412 to detect anomalous flow types quicker, earlier, and with greater ease as compared to detecting anomalous flow types of all incoming traffic. In certain embodiments, traffic monitoring applications 420 may disable applications 210 that generate anomalous flows. If a particular application 210 is responsible for malicious traffic on more than one device (e.g., multiple mobile devices 120), traffic monitoring application 420 may flag that particular application 210 and/or disable that particular application 210 throughout network 110.

One or more nodes 140 (e.g., an aggregation device) of network 110 may utilize applications labels 412 to identify particular application flows and perform one or more actions based on the identified application flows. For example, node 140 may move an application flow to a honeypot network path that quarantines the application flow. As another example, node 140 may withdraw one or more labels from an application flow. As still another example, node 140 may reassign one or more labels associated with an application flow.

In operation, mobile agent 122 of mobile device 120 acts as a routing agent and engages with network 110 to allow different traffic flows to be routed over different paths from mobile device 120 to nodes 140 (e.g., SD-WAN gateways, VPN head-end nodes, or destination nodes). Mobile agent 122 runs on mobile device 120 and is thus in a position to observe applications 210 generating and/or consuming the communication flows. Through a lookup in database 410, mobile agent 122 maps an application type and version into an integer and incorporate the integer into a flow label to generate application label 412. Mobile agent 122 labels different flows using application labels 412, which provides nodes 140 with the ability to route the traffic more efficiently and to apply specific routing rules to different flow types. Application labels 412 provide relevant information to traffic monitoring applications 420 about which application 210 is responsible for a particular connection. Traffic-monitoring applications 420 may then use this information retrieved from application labels 412 to better detect anomalies in the data stream and act on them more effectively.

Although FIG. 4 illustrates a particular arrangement of network 110, mobile device 120, mobile agent 122, applications 210, database 410, application labels 412, nodes 140, and traffic monitoring applications 420, this disclosure contemplates any suitable arrangement of network 110, mobile device 120, mobile agent 122, applications 210, database 410, application labels 412, nodes 140, and traffic monitoring applications 420. For example, applications 210 may be stored in database 410 of mobile device 120. Although FIG. 4 illustrates a particular number of networks 110, mobile devices 120, mobile agents 122, applications 210, databases 410, application labels 412, nodes 140, and traffic monitoring applications 420, this disclosure contemplates any suitable number of networks 110, mobile devices 120, mobile agents 122, applications 210, databases 410, application labels 412, nodes 140, and traffic monitoring applications 420. For example, mobile device 120 may include multiple mobile agents 122 and/or multiple databases 410.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes RAM. This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes ROM. Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A device, comprising: one or more processors; and one or more computer-readable non-transitory storage media coupled to the one or more processors and comprising instructions that, when executed by the one or more processors, cause the device to perform operations comprising: detecting, by a mobile agent of the device, a request to route traffic to a service associated with an application; identifying, by the mobile agent, an application identifier associated with the application, wherein the application identifier uniquely identifies the application; mapping, by the mobile agent and using a lookup in a database of the device, a type and a version of the application into an integer; selecting, by the mobile agent and using the application identifier, a label from a plurality of labels included in a routing table, wherein the label includes: one or more routes; and the integer representing the type and the version of the application; and routing, by the mobile agent, the traffic to the service associated with the application using the label.

2. The device of claim 1, wherein: the label supports extranet services having inline security services; and the inline security services include at least one of the following: firewall services; intrusion detection services; intrusion prevention services; or Cloud Access Security Broker (CASB) services.

3. The device of claim 1, wherein a head-end node: receives the label; maintains one or more policies in a policy table; and uses the one or more policies and the label to route the traffic to the service associated with the application.

4. The device of claim 1, the operations further comprising: receiving, by the mobile agent, a Domain Name System (DNS) request; and using the application identifier to map the DNS request to the label.

5. The device of claim 1, wherein the label is associated with at least one of the following: a Software-Defined Wide Area Network (SD-WAN); a virtual private network (VPN); a Multiprotocol Label Switching (MPLS) label; a Network Service Header (NSH) label; or a Generic Network Virtualization encapsulation (GENEVE) tunnel label.

6. The device of claim 1, wherein the service is associated with at least one of the following: a public infrastructure as a service (IaaS); a private IaaS; a public software as a service (SaaS); a private SaaS; or a private enterprise service.

7. The device of claim 1, the operations further comprising: maintaining, by the mobile agent, a policy table comprising one or more policies; and mapping, by the mobile agent, the application identifier associated with the application to the label using the one or more policies.

8. A method, comprising: detecting, by a device, a request to route traffic to a service associated with an application; identifying, by the device, an application identifier associated with the application, wherein the application identifier uniquely identifies the application; mapping, by a mobile agent of the device and using a lookup in a database of the device, a type and a version of the application into an integer; selecting, by the device and using the application identifier, a label from a plurality of labels included in a routing table, wherein the label includes: one or more routes; and the integer representing the type and the version of the application; and routing, by the device, the traffic to the service associated with the application using the label.

9. The method of claim 8, wherein: the label supports extranet services having inline security services; and the inline security services include at least one of the following: firewall services; intrusion detection services; intrusion prevention services; or Cloud Access Security Broker (CASB) services.

10. The method of claim 8, wherein a head-end node: receives the label; maintains one or more policies in a policy table; and uses the one or more policies and the label to route the traffic to the service associated with the application.

11. The method of claim 8, further comprising: receiving a Domain Name System (DNS) request; and using the application identifier to map the DNS request to the label.

12. The method of claim 8, wherein the label is associated with at least one of the following: a Software-Defined Wide Area Network (SD-WAN); a virtual private network (VPN) a Multiprotocol Label Switching (MPLS) label; a Network Service Header (NSH) label; or a Generic Network Virtualization encapsulation (GENEVE) tunnel label.

13. The method of claim 8, wherein the service is associated with at least one of the following: a public infrastructure as a service (IaaS); a private IaaS; a public software as a service (SaaS); a private SaaS; or a private enterprise service.

14. The method of claim 8, further comprising: maintaining a policy table comprising one or more policies; and mapping the application identifier associated with the application to the label using the one or more policies.

15. One or more computer-readable non-transitory storage media embodying instructions that, when executed by a processor, cause the processor to perform operations comprising: detecting, by a device, a request to route traffic to a service associated with an application; identifying, by a device, an application identifier associated with the application, wherein the application identifier uniquely identifies the application; mapping, by a mobile agent of the device and using a lookup in a database of the device, a type and a version of the application into an integer; selecting, by the device and using the application identifier, a label from a plurality of labels included in a routing table, wherein the label includes: one or more routes; and the integer representing the type and the version of the application; and routing, by the device, the traffic to the service associated with the application using the label.

16. The one or more computer-readable non-transitory storage media of claim 15, wherein: the label supports extranet services having inline security services; and the inline security services include at least one of the following: firewall services; intrusion detection services; intrusion prevention services; or Cloud Access Security Broker (CASB) services.

17. The one or more computer-readable non-transitory storage media of claim 15, wherein a head-end node: receives the label; maintains one or more policies in a policy table; and uses the one or more policies and the label to route the traffic to the service associated with the application.

18. The one or more computer-readable non-transitory storage media of claim 15, the operations further comprising: receiving, by the mobile agent, a Domain Name System (DNS) request; and using the application identifier to map the DNS request to the label.

19. The one or more computer-readable non-transitory storage media of claim 15, wherein the label is associated with at least one of the following: a Software-Defined Wide Area Network (SD-WAN); a virtual private network (VPN) a Multiprotocol Label Switching (MPLS) label; a Network Service Header (NSH) label; or a Generic Network Virtualization encapsulation (GENEVE) tunnel label.

20. The one or more computer-readable non-transitory storage media of claim 15, wherein the service is associated with at least one of the following: a public infrastructure as a service (IaaS); a private IaaS; a public software as a service (SaaS); a private SaaS; or a private enterprise service.

* * * * *